M. NORRING.
COOP.
APPLICATION FILED AUG. 29, 1916.
1,213,124. Patented Jan. 16, 1917.
2 SHEETS—SHEET 1.
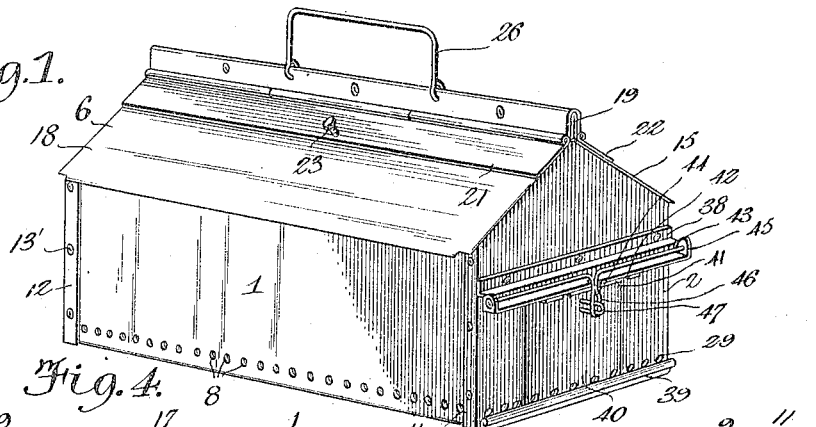
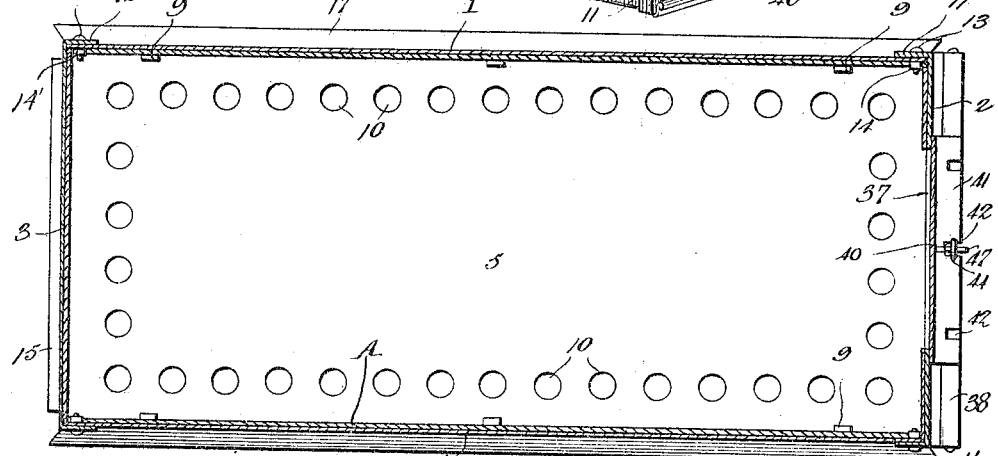
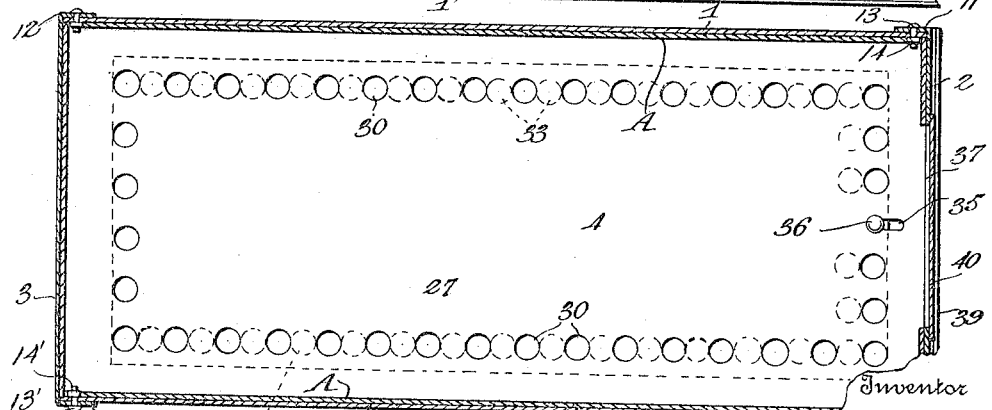
Witness
Frederick W. Ely
Inventor
Morris Norring.
By Victor J. Evans
Attorney

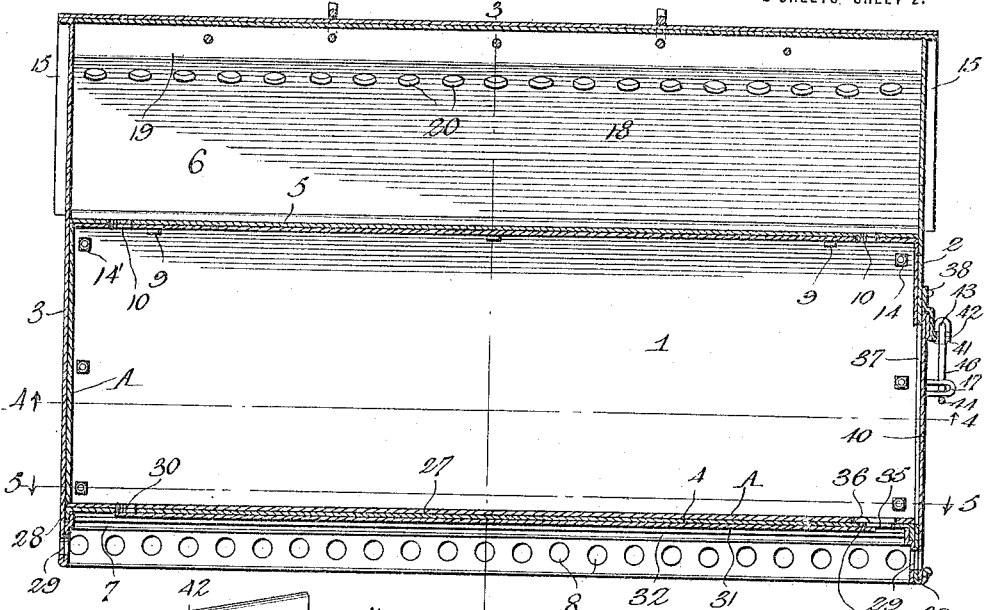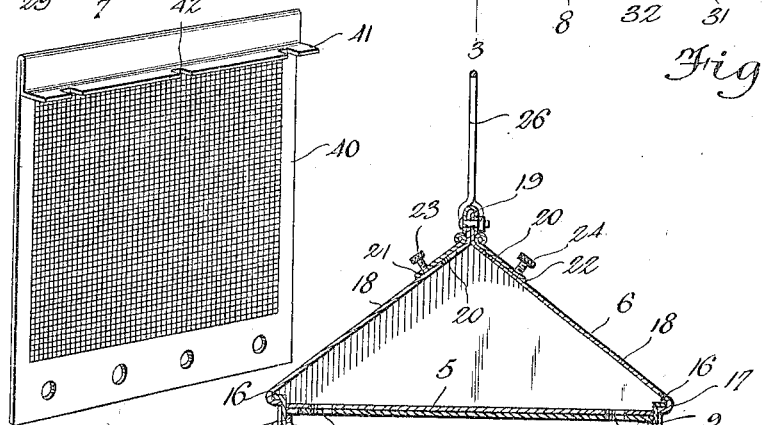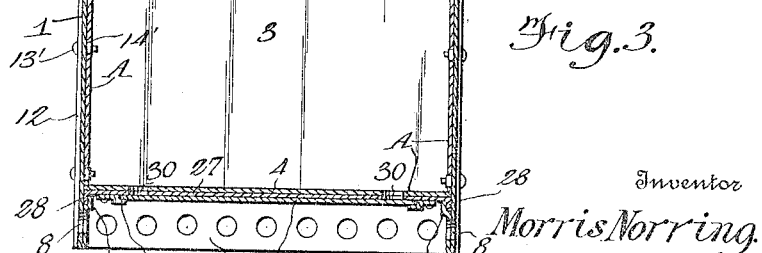

UNITED STATES PATENT OFFICE.

MORRIS NORRING, OF ROLFE, IOWA.

COOP.

1,213,124.　　　Specification of Letters Patent.　　Patented Jan. 16, 1917.

Application filed August 29, 1916.　Serial No. 117,502.

*To all whom it may concern:*

Be it known that I, MORRIS NORRING, a citizen of the United States, residing at Rolfe, in the county of Pocahontas and State of Iowa, have invented new and useful Improvements in Coops, of which the following is a specification.

This invention relates to improvements in coops.

In carrying out my invention it is my purpose to produce a coop especially designed for protecting young chicks until they are large enough to take care of themselves.

It is also my purpose to construct a coop of this character which can be readily ventilated to maintain a desired temperature therein, the ventilating means being easily operated to accommodate varying weather conditions.

It is a further object of the invention to produce a brood coop that may be easily and quickly knocked down as for transportation or when not in use and which may be as easily and quickly set up.

It is a still further object of the invention to produce a brood coop having an inner lining of non-heat conducting material and to provide the same with ventilating means whereby the currents of air will be directed from the bottom against or near the walls or interlining and be permitted to circulate through the ceiling of the coop to provide outlet passages through the roof of the said coop, means being provided for regulating the said outlet passages in the roof.

With the above and other objects in view the improvement resides in the construction, combination and arrangement of parts set forth in the following specification and falling within the scope of the appended claims.

In the drawings: Figure 1 is a perspective view of a brood coop constructed in accordance with the present invention, Fig. 2 is a central vertical longitudinal sectional view through the same, Fig. 3 is a transverse sectional view approximately on the line 3—3 of Fig. 2, Fig. 4 is a horizontal sectional view approximately on the line 4—4 of Fig. 3, Fig. 5 is a similar view approximately on the line 5—5 of Fig. 3, and Fig. 6 is a perspective view of a reticulated door which may be employed.

The coop may be constructed of any desired material, preferably of metal plates, the side and end plates, as well as the top or ceiling, and if desired the floor, being preferably provided upon their inner surfaces with a coating of non-heat conducting material, indicated by the character A.

The structure includes sides 1, a front 2 and a back 3, a bottom or floor 4, a top or ceiling 5 and a roof 6.

The side plates 1, at their lower edges, are provided with longitudinally extending cleats or flanges 7, the said cleats at their upper edges being spaced away from the inner walls of the sides for a purpose which will presently be described, and the said lower edges as well as the cleats 7 of the sides are provided with a plurality of spaced air inlet openings 8. The sides 1 at the upper edges thereof are provided with spaced longitudinally arranged inturned members or lugs 9, and these lugs are adapted to provide means for supporting the ceiling plate 5. The ceiling plate, adjacent its edges, is provided with spaced air inlet openings 10 and the said ceiling plate is of a size to be snugly received between the sides and between the front and back of the structure.

Both the front and back 2 and 3 respectively have their vertical edges formed with inturned flanges 11 and 12 respectively, the flanges 11 of the front being disposed over the outer faces of the sides 1 and being connected thereto by removable elements, such as bolts 13 and nuts 14 therefor, while the flanges 12 of the back 3 likewise engage with the outer corners of the sides and are connected thereto by similar bolts 13′ and nuts 14′. If desired, however, in lieu of the nuts and bolts the flanges 11 and 12 may be riveted to the sides. The roof 6 is in the nature of a pitch gable roof and therefore the front and back 2 and 3, above their connections with the sides 1, are arranged at an upward or inward pitch or angle and these angular edges are formed with lipped flanges 15. The upper edges of the sides 1 are likewise formed with longitudinally arranged flanges 16 and these lipped or lapped flanges 15 and 16 are adapted to receive similar arranged flanges 17 upon the edges of the side members 18 of the roof 6, and when the flanges are forced into engagement with each other it will be noted that the roof will be effectively sustained upon the remainder of the structure. The angular side members 18 of the roof are connected by a ridge pole 19, and the portions of the said side members, adjacent to the said ridge pole, are provided with a series of longitudinally arranged spaced openings 20. These openings may be closed or regulated by flat valve members 21 and 22 respectively which are hingedly or otherwise secured to the ridge pole 19, and if desired, means such as adjustable elements 23 and 24 may be provided between the valves 21 and 22 for regulating the adjustment of the said valves. For convenience in carrying the coop the central portion of the ridge pole is provided with a handle 26.

The floor, which is indicated by the numeral 27, comprises a flat plate of a size to be snugly received between the front and back and the sides of the device, the said floor having its edges formed with downturned flanges 28. The longitudinal flanges are adapted to be received between the cleats 7 and the sides 1 are forced into tight engagement with the said cleats and the said sides. The lower edges of the front and back are provided with ventilating openings 29 and if desired the said front and back 2 and 3 respectively may, on their inner faces and above the openings, be provided with cleats similar to the cleats 7, the said cleats being secured to the said front and back at only the lower edges thereof, whereby the end flanges 28 of the floor 27 may engage between the said cleats and the said front and back members of the structure. The floor, adjacent its edges, is provided with ventilating openings 30, and these openings may be closed or partially closed through the medium of a slidable plate 31 that is mounted for longitudinal movement in suitable ways 32 upon the underface of the floor plate 27, the slidable plate or valve 31 being provided with ventilating openings 33 which may be brought to register with the ventilating openings 29 in the floor or brought out of register with the said openings to close the openings in the floor. The slidable plate 31 is provided with an upstanding pin 34 that passes through an elongated slot 35 in the floor plate 27, the upper end of said pin being engaged by a notch 36 that straddles the slot 35. The notch 36 is disposed adjacent to the door opening 37 in the front plate 2, and the said front plate, adjacent to the horizontal walls provided by the said opening 37 has secured thereto strips 38 and 39 providing guideways for a slidable door 40. This door may be in the nature of a solid member, as disclosed in the main figures of the drawings, or the said door may be in the nature of a reticulated member as disclosed in Fig. 6 of the drawings. Each of the doors is provided adjacent its upper edge with an outturned flange 41 having its outer edge formed with spaced notches 42 and the guideway 38 has pivotally secured thereto a rod 43 having a central angular portion 44 providing a handle, the said rod having its ends journaled in suitable bearings 45 and the angular end of the handle may be swung to engage in any of the notches in the flange 41 to hold the door 40 either in a closed or a partially open position. The handle is preferably slotted, as at 46, and the door 40 is provided with a staple, 47, whereby the handle may be passed over the staple and a lock arranged in the staple to sustain the door in a closed position upon the coop.

From the above description, taken in connection with the accompanying drawings, the simplicity of the device, as well as the advantages thereof will, it is thought, be perfectly apparent to those skilled in the art to which such invention appertains without further detailed description.

Having thus described the invention, what I claim is:

1. A brood coop constructed from a series of removably connected plates and having a gable roof, said roof to the opposite sides of the ridge thereof having openings, valve members connected with the ridge and disposed over the openings, means for adjusting the valves with relation to the said openings, a ceiling plate disposed below the roof and having its edges provided with openings, a bottom plate having its edges provided with openings, a slidable valve for regulating these openings, and the coop, below the floor being provided with ventilating openings.

2. A brood coop constructed of a plurality of plates including a front and back and having their vertical edges flanged, side plates contacting with and secured to the flanges, cleats upon the sides, a floor plate comprising a flanged member which engages with the cleats, lugs upon the side plates, a ceiling plate resting upon the lugs, a pitch roof above and including the ceiling, interengaging flanges between the roof, front and back plates and the side plates, a door closing a door opening in the front plate, the front, back and side plates, below the floor plate being provided with openings, the floor plate having its edges provided with openings, a slidable plate providing a valve for these openings, a ceiling plate having its edges provided with openings, the top to the opposite sides of the ridge having a series of longitudinally disposed openings, and plates hingedly connected to the valve disposed to overlie the openings in the roof, and means for adjusting the said plates with relation to the said roof.

In testimony whereof I affix my signature.

MORRIS NORRING.